United States Patent
Singh et al.

(10) Patent No.: US 12,204,505 B1
(45) Date of Patent: Jan. 21, 2025

(54) COMPUTER-IMPLEMENTED SYSTEM FOR ORGANIZING DATA MIGRATION AND A METHOD THEREOF

(71) Applicant: Onix Networking Corp., New York, NY (US)

(72) Inventors: Sanjay Singh, Lawrence Township, NJ (US); Patrick Schablitzki, Corte Madera, CA (US); Ramnish Singh, Sammamish, WA (US); Jay Jambotkar, Redmond, WA (US); Anantha Balasubramanian, Bangalore (IN); Balaji Ramakrishnan, Hyderabad (IN); Rajesh Kannan, Bangalore (IN)

(73) Assignee: Onix Networking Corp., NY (US)

( * ) Notice: Subject to any disclaimer, the term of this patent is extended or adjusted under 35 U.S.C. 154(b) by 0 days.

(21) Appl. No.: 18/627,898

(22) Filed: Apr. 5, 2024

(51) Int. Cl.
*G06F 16/21* (2019.01)
*G06F 16/25* (2019.01)

(52) U.S. Cl.
CPC .......... *G06F 16/214* (2019.01); *G06F 16/217* (2019.01); *G06F 16/256* (2019.01)

(58) Field of Classification Search
CPC .. G06F 16/214; G06F 16/217; G06F 16/2282; G06F 11/3409; G06F 16/256; G06F 16/285; G06F 16/275; G06F 16/84; G06F 16/22
See application file for complete search history.

(56) References Cited

U.S. PATENT DOCUMENTS

| | | | |
|---|---|---|---|
| 9,075,529 B2 * | 7/2015 | Karve | G06F 3/0619 |
| 9,460,171 B2 * | 10/2016 | Marrelli | G06F 16/258 |
| 10,896,160 B2 | 1/2021 | Denyer et al. | |

(Continued)

OTHER PUBLICATIONS

Hall et al. "On Algorithms for Efficient Data Migration" Department of Computer Science and Engineering, University of Washington, Seattle, WA 9819 SODA '01: Proceedings of the twelfth annual ACM-SIAM symposium on Discrete algorithms (Year: 2001).*

(Continued)

*Primary Examiner* — Taelor Kim
*Assistant Examiner* — Berhanu Mitiku
(74) *Attorney, Agent, or Firm* — Jason C. Cameron (57) ABSTRACT

A computer-implemented system for organizing data migration is disclosed. The computer-implemented system includes a receiving module to receive a plurality of data as an input from a user, a recommendation module generates a plurality of recommendations by processing on the received input using an artificial intelligence model. The plurality of recommendations includes a plurality of migration plans. A cloud migration module receives a plurality of inputs based on the plurality of migration plans and automatically generate a landing zone pertaining to a first migration wave, a post-migration phase module perform a continuous improvement loop after each phase of the first migration wave, fine-tune the continuous improvement loop for subsequent migration waves, and continuously analyze a predefined cloud platform environment to identify areas of (Continued)

improvement, a chatbot module provides on-demand support to the user during and after the migration.

18 Claims, 4 Drawing Sheets

(56) References Cited

U.S. PATENT DOCUMENTS

| | | | |
|---|---|---|---|
| 2013/0339943 A1* | 12/2013 | Mallya | G06F 16/214 |
| | | | 717/176 |
| 2020/0233600 A1* | 7/2020 | Swamy | G06F 3/067 |
| 2021/0133234 A1 | 5/2021 | Bedadala et al. | |
| 2022/0004428 A1 | 1/2022 | Sun et al. | |
| 2023/0196237 A1 | 6/2023 | Ratnapuri | |
| 2023/0393876 A1* | 12/2023 | Bawcom | H04L 67/10 |

OTHER PUBLICATIONS

Giebler_et_al "A Zone reference Model for Enterprise-grade Data Lake Management" 2020 IEEE 24th International Enterprise Distributed Object Computing Conference (EDOC) IEEE Xplore: Oct. 23, 2020 (Year: 2020).*

* cited by examiner

COMPUTER-IMPLEMENTED SYSTEM FOR ORGANIZING DATA MIGRATION AND A METHOD THEREOF

FIELD OF INVENTION

Embodiments of a present disclosure relate to the field of data management and more particularly to a computer-implemented system for organizing data migration and a method thereof.

BACKGROUND

Data migration is needed for various reasons such as business expansion, data center migration, performance optimization, and the like in the lifecycle of an organization's IT infrastructure and data management practices. Data migration is the process of selecting, preparing, extracting, transforming data, and permanently transferring the data from one storage system to another. The data migration also involves lot of preparation and post-migration activities including planning, creating backups, quality testing, and validation of results. Effective planning of data migration ensures that the migration process is smooth, accurate, and minimizes the risk of data loss or corruption. However, discovering the systems to be migrated and planning the migration of the same remains a challenge.

Migrating large volumes of data to the cloud can be time-consuming and costly. Also, all applications are not suitable for cloud migration. Many organizations lack the necessary expertise and skills to plan and execute a cloud migration effectively. The cloud technologies are constantly evolving, and it can be difficult to find skilled personnel. Further, achieving optimal performance in the cloud migration requires careful configuration and tuning. Conventional approaches narrowly focus on the systems subject for migration and fail to consider past migration experiences that may otherwise optimize migration. In turn, this inefficiency creates downstream costs that are passed to the customer. Further, minimizing downtime during migration is critical.

Hence, there is a need for a computer-implemented system for organizing data migration and a method thereof which addresses the aforementioned issues.

OBJECTIVE OF THE INVENTION

An objective of the present invention is to provide an artificial intelligence enabled system for organizing data.

Another objective of the present invention is to provide automatic data migration by avoiding manual expertise and skills to plan and execute a cloud migration effectively.

Yet, an objective of the present invention is to provide the system for organizing data migration which is suitable for cloud migration and cost effective.

Further, an objective of the present invention is to achieve an optimal performance in the cloud requires careful configuration and tuning.

BRIEF DESCRIPTION

In accordance with one embodiment of the disclosure a computer-implemented system for organizing data migration is provided. The computer-implemented system includes a hardware processor and a memory. The memory coupled to the hardware processor. The memory includes a set of instructions in the form of a processing subsystem, configured to be executed by the hardware processor. The processing subsystem is hosted on a server and configured to execute on a network to control bidirectional communications among a plurality of modules. The plurality of modules includes a receiving module, a recommendation module, a cloud migration module, a post-migration phase module, and a chatbot module. The receiving module is configured to receive a plurality of data as an input from a user. The plurality of data includes data related to at least one of an infrastructure inventory, application logs, application configuration, database inventory, database logs, security and compliance report, and backup configuration report of an organization. The recommendation module is operatively connected to the receiving module. The recommendation module is configured to generate a plurality of recommendations by processing on the received input using an artificial intelligence model. The plurality of recommendations include a plurality of migration plans. The plurality of migration plans includes at least one of a migration wave plan, a migration cutover plan for each application, a database migration plan with application wave mapping, a security and compliance policy details, a data migration plan, a backup, and redundancy plan. The cloud migration module is operatively connected with the recommendation module. The cloud migration module is configured to receive a plurality of inputs based on the plurality of migration plans. The cloud migration module is also configured to automatically generate a landing zone pertaining to a first migration wave as per the received plurality of inputs. The post-migration phase module is operatively connected to the cloud migration module. The post-migration phase module is configured to perform a continuous improvement loop after each phase of the first migration wave to analyze the efficiency of the data migration and provide corrective actions for the plurality of migration plans. The post-migration phase module is also configured to fine-tune the continuous improvement loop for subsequent migration waves. Further, the post-migration phase module is configured to continuously analyze a predefined cloud platform environment to identify areas of improvement. The areas include right-sizing instances, optimizing storage, and adjusting configurations based on usage patterns. The chatbot module is operatively connected to the post-migration phase module wherein the chatbot module is configured to provide on-demand support to the user during and after the migration.

In accordance with another embodiment a method for organizing data migration is provided. The method includes receiving, by a receiving module, a plurality of data as an input from a user, wherein the plurality of data includes data related to at least one of an infrastructure inventory, application logs, application configuration, database inventory, database logs, security and compliance report, and backup configuration report of an organization. The method also includes generating, by a recommendation module, a plurality of recommendations by processing on the received input using an artificial intelligence model, wherein the plurality of recommendations comprises a plurality of migration plans with at least one of a migration wave plan, a migration cutover plan for each application, a database migration plan with application wave mapping, a security and compliance policy details, a data migration plan, a backup, and redundancy plan. Further, the method includes receiving, by cloud migration module, a plurality of inputs based on the plurality of migration plans. Furthermore, the method includes automatically generating, by the cloud migration module, a landing zone pertaining to a first migration wave as per the received plurality of inputs.

Furthermore, the method includes performing, by a post-migration phase module, a continuous improvement loop after each phase of the first migration wave to analyze the efficiency of the data migration and provide corrective actions for the plurality of migration plans. Furthermore, the method includes fine-tuning, by the post-migration phase module, the continuous improvement loop for subsequent migration waves. Furthermore, the method includes continuously analyzing, by the post-migration phase module, a predefined cloud platform environment to identify areas of improvement, wherein the areas comprises right-sizing instances, optimizing storage, and adjusting configurations based on usage patterns. Furthermore, the method includes providing, by a chatbot module, on-demand support to the user during and after the migration.

In accordance with an embodiment of the present disclosure a non-transitory computer-readable medium storing a computer program that, when executed by a processor, causes the processor to a method for organizing data migration is provided. The method includes receiving, by a receiving module, a plurality of data as an input from a user, wherein the plurality of data includes data related to at least one of an infrastructure inventory, application logs, application configuration, database inventory, database logs, security and compliance report, and backup configuration report of an organization. The method also includes generating, by a recommendation module, a plurality of recommendations by processing on the received input using an artificial intelligence model, wherein the plurality of recommendations comprises a plurality of migration plans with at least one of a migration wave plan, a migration cutover plan for each application, a database migration plan with application wave mapping, a security and compliance policy details, a data migration plan, a backup, and redundancy plan. Further, the method includes receiving, by cloud migration module, a plurality of inputs based on the plurality of migration plans. Furthermore, the method includes automatically generating, by the cloud migration module, a landing zone pertaining to a first migration wave as per the received plurality of inputs. Furthermore, the method includes performing, by a post-migration phase module, a continuous improvement loop after each phase of the first migration wave to analyze the efficiency of the data migration and provide corrective actions for the plurality of migration plans. Furthermore, the method includes fine-tuning, by the post-migration phase module, the continuous improvement loop for subsequent migration waves. Furthermore, the method includes continuously analyzing, by the post-migration phase module, a predefined cloud platform environment to identify areas of improvement, wherein the areas comprises right-sizing instances, optimizing storage, and adjusting configurations based on usage patterns. Furthermore, the method includes providing, by a chatbot module, on-demand support to the user during and after the migration.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation on the scope of the disclosure is thereby intended. Such alterations and further modifications in the illustrated system, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures, or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a computer-implemented system for organizing data migration. The computer-implemented system includes a hardware processor and a memory. The memory coupled to the hardware processor. The memory includes a set of instructions in the form of a processing subsystem, configured to be executed by the hardware processor. The processing subsystem is hosted on a server and configured to execute on a network to control bidirectional communications among a plurality of modules. The plurality of modules includes a receiving module, a recommendation module, a cloud migration module, a post-migration phase module, and a chatbot module. The receiving module is configured to receive a plurality of data as an input from a user. The plurality of data includes data related to at least one of an infrastructure inventory, application logs, application configuration, database inventory, database logs, security and compliance report, and backup configuration report of an organization. The recommendation module is operatively connected to the receiving module. The recommendation module is configured to generate a plurality of recommendations by processing on the received input using an artificial intelligence model. The plurality of recommendations include a plurality of migration plans. The plurality of migration plans includes at least one of a migration wave plan, a migration cutover plan for each application, a database migration plan with application wave mapping, a security and compliance policy details, a data migration plan, a backup, and redundancy plan. The cloud migration module is operatively connected with the recommendation module. The cloud migration module is configured to receive a plurality of inputs based on the plurality of migration plans. The cloud migration module is also configured to automatically generate a landing zone pertaining to a first migration wave as per the received plurality of inputs. The post-migration phase module is operatively connected to the cloud migration module. The post-migration phase module is configured to perform a continuous improvement loop after each phase of the first migration wave to analyze the efficiency of the data migration and provide corrective actions for the plurality of migration plans. The post-migration phase module is also configured to fine-tune the continuous improvement loop for subsequent migration waves. Further, the post-migration phase module is configured to continuously analyze a predefined cloud platform environment to identify areas of improvement. The areas include right-sizing instances, optimizing storage, and adjusting configurations based on usage patterns. The chatbot module is operatively connected to the post-migration phase module wherein the chatbot module is configured to provide on-demand support to the user during and after the migration.

Figure 1:
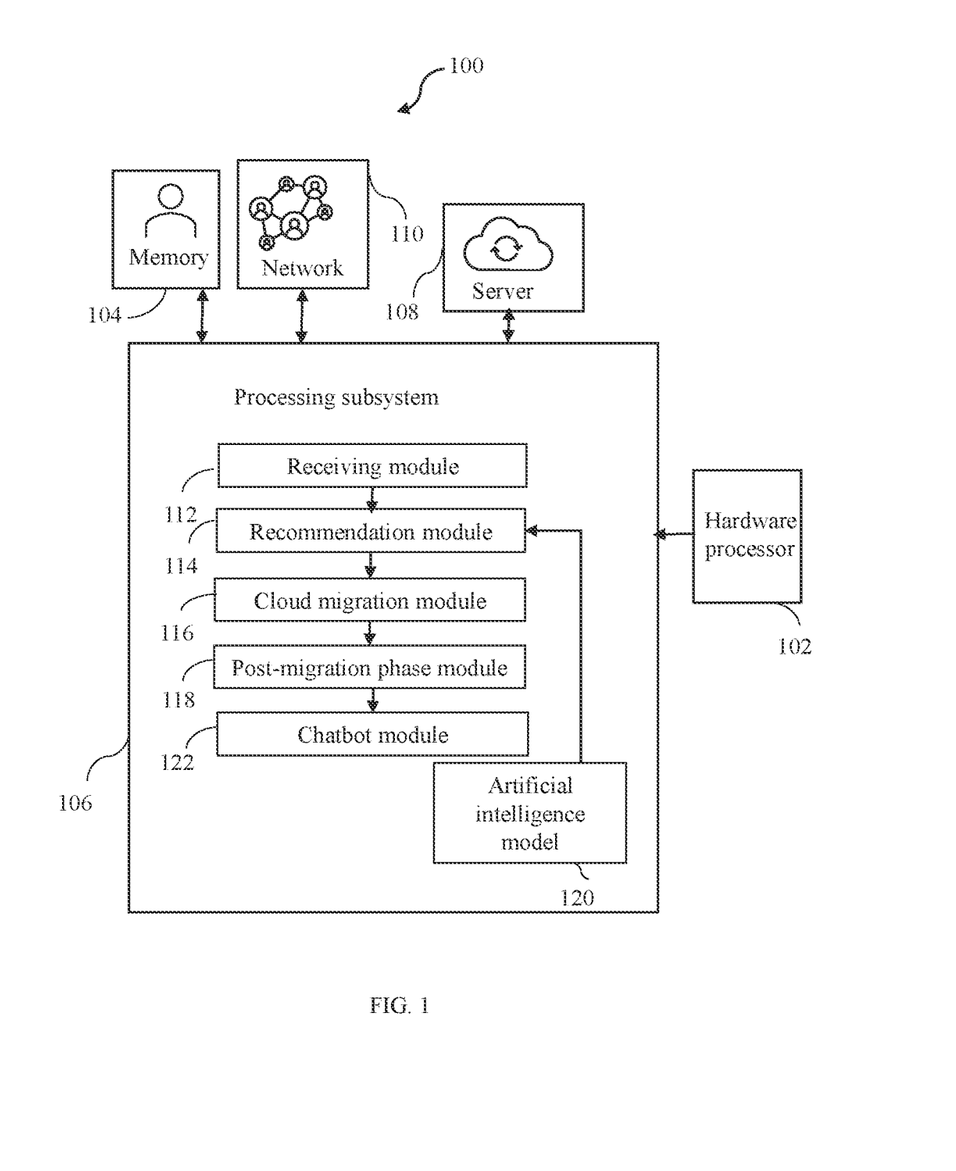
FIG. 1 is a block diagram a computer-implemented system for organizing data migration in accordance with an embodiment of the present disclosure.

FIG. 1 is a block diagram representing a computer-implemented system 100 for organizing data migration in accordance with an embodiment of the present disclosure. The computer-implemented system 100 includes a hardware processor 102 coupled to a memory 104. The memory 104 includes a set of instructions in the form of a processing subsystem 108, configured to be executed by the hardware processor 102. The processing subsystem 106 is hosted on a server 108 and configured to execute on a network 110 to control bidirectional communications among a plurality of modules. In one embodiment, the server 108 may include a cloud server. In another embodiment, the server 108 may include a local server. In one embodiment, the network 110 may include a wired network such as a local area network (LAN). In another embodiment, the network may include a wireless network such as Wi-Fi, Bluetooth, Zigbee, near-field communication (NFC), infrared communication (RFID), or the like.

The plurality of modules includes a receiving module 112, a recommendation module 114, a cloud migration module 116, a post-migration phase module 118, and a chatbot module 122.

The receiving module 112 is configured to receive a plurality of data as an input from a user. The plurality of data includes data related to at least one of an infrastructure inventory data, application logs, application configuration, database inventory, database logs, security and compliance report, and backup configuration report of an organization. In one embodiment, the inventory data comprises a comprehensive list of the plurality of applications, servers, virtual machines, and a plurality of assets used within the organization, wherein the inventory serves as the foundation for understanding a scope of the migration.

The recommendation module 114 is operatively connected to the receiving module 112. The recommendation module 114 is configured to generate a plurality of recommendations by processing the received input using an artificial intelligence model 120. The plurality of recommendations includes a plurality of migration plans including at least one of a migration wave plan, a migration cutover plan for each application, a database migration plan with application wave mapping, a security and compliance policy details, a data migration plan, a backup, and redundancy plan.

In one embodiment, the AI-powered data migration refers to the use of artificial intelligence (AI) techniques and algorithms to automate and streamline the process of moving data from one system, storage, or format to another. This approach leverages machine learning, natural language processing, and other AI technologies to enhance various aspects of the migration process, including data mapping, transformation, validation, and quality assurance.

In one embodiment, the recommendation module 114 performs processing on the received inputs by a plurality of applications. The plurality of application includes an application dependency mapping which is a process of identifying and documenting the relationships and dependencies between various applications, systems, services, and components within the organization's IT environment. The plurality of application also includes a database dependency mapping which involves identifying and documenting the relationships and dependencies between a plurality of databases, as well as between databases and other components within the organization's IT infrastructure. Further, the plurality of application also includes an application business hours calculation which involves determining the operational hours of a business or organization for a given day and then performing calculations for operational hours based on those hours. Furthermore, the plurality of applications also includes a target server sizing based on current and forecasting. Furthermore, the plurality of applications includes a security and compliance mapping based on assessment reports which involves aligning security controls and compliance requirements with specific organizational policies, standards, regulations, or frameworks. Moreover, the plurality of applications includes a target server optimization based on server inventory and usage capacity. In one embodiment, optimizing target servers involves enhancing their performance, efficiency, and resource utilization to meet the needs of the applications or workloads they host. Moreover, the plurality of applications includes a plurality backup policies and redundancy. The planning of the data migration needs a robust backup policy and redundancy plan which is critical to ensure the integrity and availability of data throughout the migration process.

In another embodiment, the recommendation module 114 is configured to classify the plurality of applications into migration waves using artificial intelligence. In one embodiment, the migration waves refer to the organized and phased approach taken during the data migration to systematically transfer data from one system or location to another.

The cloud migration module 116 is operatively connected with the recommendation module 114. The cloud migration module 116 is configured to receive a plurality of inputs from the recommendation module 116 based on the plurality of migration plans. The cloud migration module 116 is also configured to automatically generate a landing zone pertaining to a first migration wave as per the received plurality of inputs. In one embodiment, the cloud migration module 116 automatically generates a plurality of migrations comprising at least one of a storage migration, a network migration, a migration, a server migration, and an application migration. In one embodiment, the landing zone, is a modular and scalable configuration that enables organizations to adopt a cloud database for their business needs. In the context of data migration, a landing zone refers to a temporary or intermediary storage location where data is initially transferred during the migration process before being processed further and integrated into the target system or destination. In another embodiment, the landing zone is used for various objectives such as data validation, data transformation, error handling, performance optimization, and the like. Moreover, the landing zone plays a crucial role in facilitating a smooth and efficient data migration process by providing a structured environment for staging, validating, transforming, and troubleshooting data before it is transferred to its final destination.

The post-migration phase module 118 is operatively connected to the cloud migration module 116. The post-migration phase module 118 is configured to perform a continuous improvement loop after each phase of the first migration wave to analyze the efficiency of the data migration and provide corrective actions for the plurality of migration plans. The post-migration phase module 118 is also configured to fine-tune the continuous improvement loop for subsequent migration waves. Further, the post-migration phase module 118 is configured to continuously analyze a predefined cloud platform environment to identify areas of improvement, wherein the areas comprises right-sizing instances, optimizing storage, and adjusting configurations based on usage patterns. In one embodiment, the post migration phase module 118 configured to generate detailed documentation and reports of the migration process, timelines, resource configurations, and performance metrics using artificial intelligence. In another embodiment, the post migration phase module 118 is configured to analyze errors that occur during the migration and provide automated remediation plans.

The chatbot module 122 is operatively connected to the post-migration phase module 118 wherein the chatbot module 122 is configured to provide on-demand support to the user during and after the migration. In one embodiment, the chatbot module 122 is configured to answer questions asked by the user, provide documentation, and assist the user during the data migration.

Consider a non-limiting example where the computer-implemented system 100 receives data related to inventory from a user X of an organization via an application. The received data is then processed by the artificial intelligence model 120. The process includes performing application mapping, the business hours calculation of the application, generating assessment reports and provide security and compliance based on the assessment reports. The processed data is used for recommending the user X a different migration plans such as at least one of a migration wave plan, a migration cutover plan for each application, a database migration plan with application wave mapping, a security and compliance policy details, a data migration plan, a backup and redundancy plan 218. The computer implemented system 100 performs cloud-based migration. The cloud-based migration automatically generates a landing zone pertaining to a first migration wave as per the received plurality of inputs based on the migration plan. After migration, using a machine learning model a fine-tuning of the continuous improvement loop for subsequent migration waves. After fine-tuning, continuous analysis of a predefined cloud platform environment is performed. The continuous analysis is performed to identify areas of improvement, including right-sizing instances, optimizing storage, and adjusting configurations based on usage patterns of the user X. During the migration or after the migration the user X may get on-demand support from the chatbot module.

Figure 2:
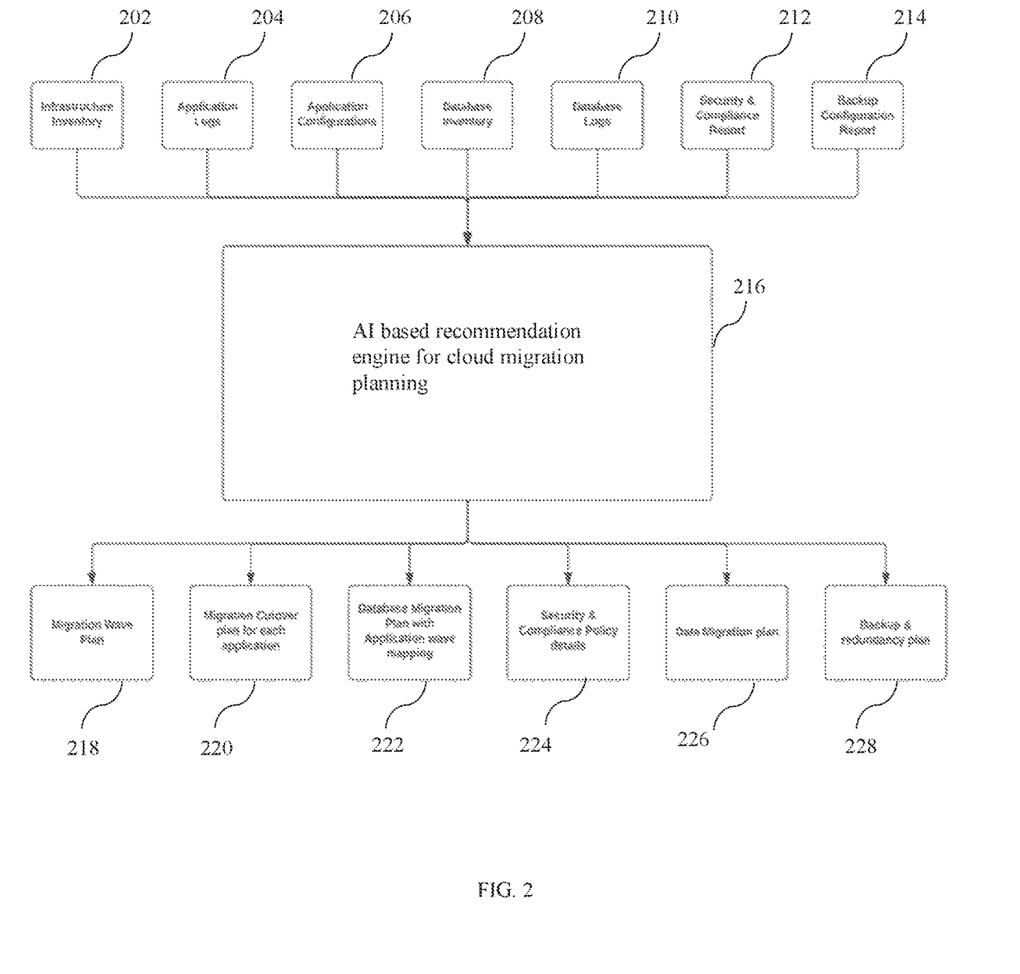
FIG. 2 is a flowchart representing an exemplary workflow of the computer implemented system for organizing data migration of FIG. 1 in accordance with an embodiment of the present disclosure.

FIG. 2 is a flowchart representing an exemplary workflow of the computer implemented system for organizing data migration of FIG. 1 in accordance with an embodiment of the present disclosure. In one embodiment, the system 100 includes a meticulous collection of crucial data sources from the organization's existing information technology (IT) infrastructure. The data sources includes an infrastructure inventory 202 data which includes a comprehensive list of all applications, servers, virtual machines, and other assets which are currently in use within the organization. Further, the infrastructure inventory 202 serves as the foundation for understanding the scope of the migration. The data sources also includes a plurality of application log 204 files which includes a plurality of valuable log files generated by servers, applications, and network resources. In a specific embodiment, the one or more networking resources includes virtual private cloud, subnet, load balancer, firewall, virtual private network, direct connect, route tables, network security groups, domain name system, content delivery network, public IP addresses, private link, gateway services, network monitoring and logging. These logs contain historical usage patterns, performance metrics, error records, and other critical insights that inform the migration strategy. Further, the data sources includes a plurality of application configurations 206 which includes detailed information about the configurations and settings of each application and server, shedding light on how they function and interconnect with other components. Furthermore, the data sources includes database logs 210 which are stored in a database inventory 208. Moreover, the data sources include a backup configuration report 214 which includes backup policies to avoid data loss.

Furthermore, the data sources include a classification of migration waves. The AI-powered migration planning process involves grouping applications into migration waves, each representing a set of applications scheduled to migrate together. The classification of these waves is based on several factors such as data priority, data complexity, data volume, data dependencies, and the like. Furthermore, the data sources include an application usage history which includes historical data on how applications are used and their resource consumption. This data helps identify which applications are mission-critical and must be prioritized in the migration wave plan 218. In one embodiment, in a wave plan, grouping of similar applications together, accounting for infrastructure and application dependencies (such as a shared database), the priority of the applications, similarity of application architecture, and business functionality.

Moreover, the data sources include application interdependencies. In one embodiment, the application interdependencies include a thorough analysis of relaying of applications on one another or sharing data and resources. Understanding these interdependencies is crucial to avoid disruptions during migration. Moreover, the data sources include database dependencies which includes recognizing the central role that databases play in many applications. It is essential to identify how applications depend on specific databases and vice versa. Moreover, the data sources include AI engine analysis. In one embodiment, AI based recommendation engine for cloud migration planning 216 is an important part of the system. This sophisticated software system utilizes cutting-edge machine learning algorithms to analyze the collected data and dependencies. The key components of this AI engine include a fine-tuned machine learning model (ML) model, leveraging organizational expertise, an optimized data migration plan 226, a security and compliance policy details 224 for mapping based on assessment reports or security and compliance reports 212. In one embodiment, the fine-tuned ML model is a specialized machine learning model that has been meticulously trained and fine-tuned specifically for migration scenarios. This model incorporates insights from past migrations and domain-specific knowledge to make precise predictions and informed decisions.

In one embodiment, training of machine learning (ML) model 110 may be described as follows. Initially, the plurality of datapoints from a document is collected and processed for a specific attribute. The verification of data-and computation-is applicable for ML applications. However, being a data-centric method, ML has also elevated data to become the most crucial factor of ML success. Further a training data set may be created in a form of a list including the data points and class of respective attribute in the document. The training data set may be used to train the pretrained language model. In one embodiment, the ML training involves collection of data sources, preprocessing techniques, model architectures, training procedures, evaluation results, and deployment configurations. This ensures transparency, reproducibility, and accountability in the development and operation of the machine learning model for data migration.

In one embodiment, in leveraging organizational expertise, the AI engine draws upon the deep well of knowledge and experience within the organization. This includes best practices, historical data from previous migrations, and unique insights into the organization's specific needs and challenges. In one embodiment, the optimized migration plan is a meticulously crafted migration plan produced by the AI-powered analysis. This plan encompasses a plurality of key elements such as a sequencing and timing and a cutover window. The sequencing and Timing outlines the precise sequence in which applications may migrate and the timing of each migration. Critical applications are prioritized, ensuring minimal disruption to business operations. The cutover window is a designated time frame. The cutover window is carefully chosen based on application usage history and dependencies. This window represents the optimal time for migration to minimize impact on users and operations. In one embodiment, the cloud may include a private cloud, a public cloud, and a hybrid cloud.

Figure 3:
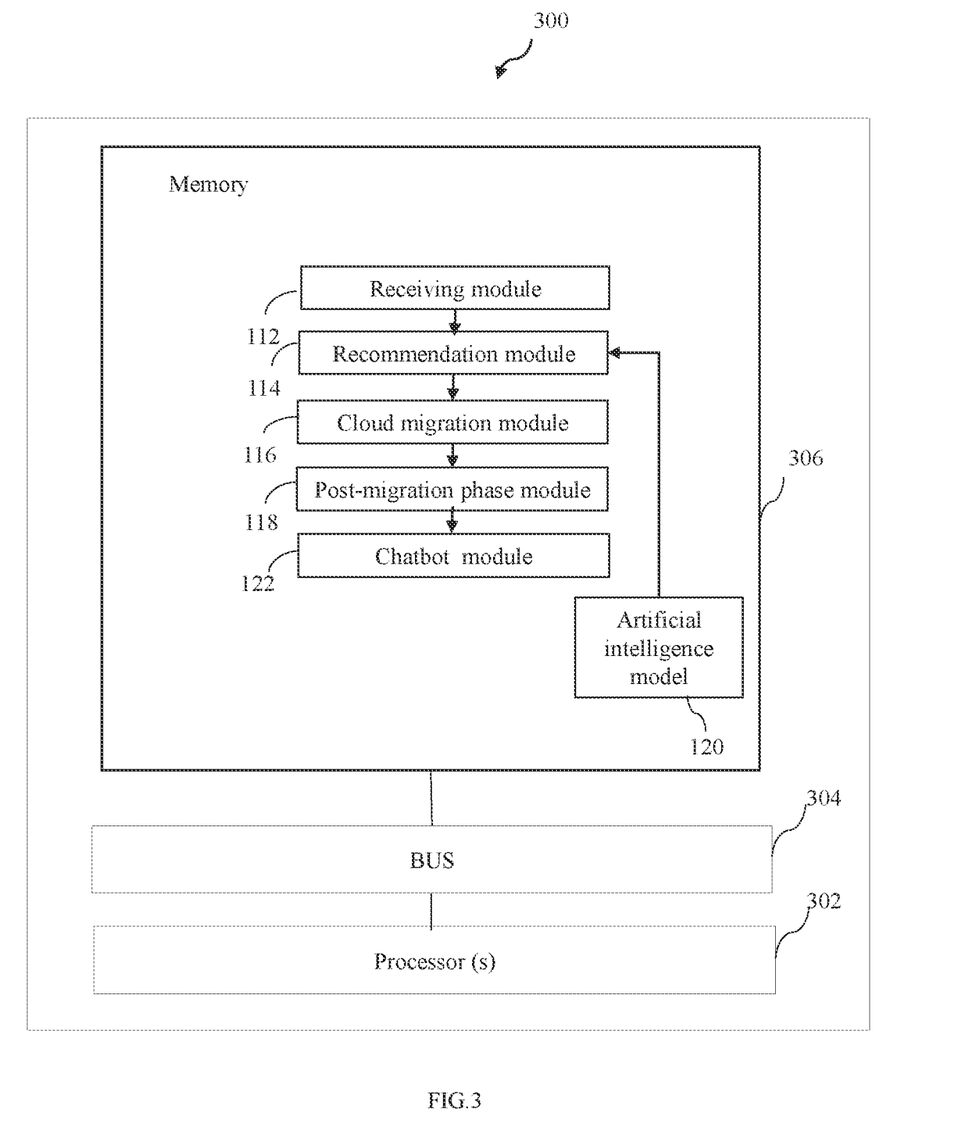
FIG. 3 is a block diagram of a computer or a server for the computer-implemented system for organizing data migration in accordance with an embodiment of the present disclosure.

FIG. 3 is a block diagram of a computer or a server for the computer-implemented system for organizing data migration in accordance with an embodiment of the present disclosure. The server includes a processor(s) 302, and memory 302 operatively coupled to the bus 304.

The processor(s) 302 as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The bus 304 as used herein refers to internal memory channels or computer networks that is used to connect computer components and transfer data between them. The bus 304 includes a serial bus or a parallel bus, wherein the serial bus transmits data in a bit-serial format and the parallel bus transmits data across multiple wires. The bus 304 as used herein, may include but not limited to, a system bus, an internal bus, an external bus, an expansion bus, a frontside bus, a backside bus, and the like.

The memory 306 includes a plurality of subsystems and a plurality of modules stored in the form of an executable program which instructs the processor to the computer-implemented system illustrated in FIG. 1. The memory 306 is substantially similar for the system for organizing data migration of FIG. 1. The memory 306 has submodules: a receiving module 112, a recommendation module 114, a cloud migration module 116, a post-migration phase module 118, and a chatbot module 120.

The receiving module 112 is configured to receive a plurality of data as an input from a user. The plurality of data includes data related to at least one of an infrastructure inventory, application logs, application configuration, database inventory, database logs, security and compliance report, and backup configuration report of an organization.

The recommendation module 114 is operatively connected to the receiving module 112. The recommendation module 114 is configured to generate a plurality of recommendations by processing on the received input using an artificial intelligence model 120. The plurality of recommendations includes a plurality of migration plans including at least one of a migration wave plan, a migration cutover plan for each application, a database migration plan with application wave mapping, a security and compliance policy details, a data migration plan, a backup, and redundancy plan.

The cloud migration module 116 is operatively connected with the recommendation module 114. The cloud migration module 116 is configured to receive a plurality of inputs based on the plurality of migration plans. The cloud migration module 116 is also configured to automatically generate a landing zone pertaining to a first migration wave as per the received plurality of inputs. In one embodiment, the artificial intelligence model enables migration planning process comprising grouping of the plurality of applications into migration waves, wherein each migration wave represents a set of applications scheduled to migrate together.

The post-migration phase module 118 is operatively connected to the cloud migration module 116. The post-migration phase module 118 is configured to perform a continuous improvement loop after each phase of the first migration wave to analyze the efficiency of the data migration and provide corrective actions for the plurality of migration plans. The post-migration phase module 118 is also configured to fine-tune the continuous improvement loop for subsequent migration waves. Further, the post-migration phase module 118 is configured to continuously analyze a predefined cloud platform environment to identify areas of improvement, wherein the areas comprises right-sizing instances, optimizing storage, and adjusting configurations based on usage patterns.

The chatbot module 122 is operatively connected to the post-migration phase module 118 wherein the chatbot module 122 is configured to provide on-demand support to the user during and after the migration.

Computer memory elements may include any suitable memory device(s) for storing data and executable program, such as read-only memory, random access memory, erasable programmable read-only memory, electrically erasable programmable read-only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. An executable program stored on any of the above-mentioned storage media may be executable by the processor(s) 302.

Figure 4:
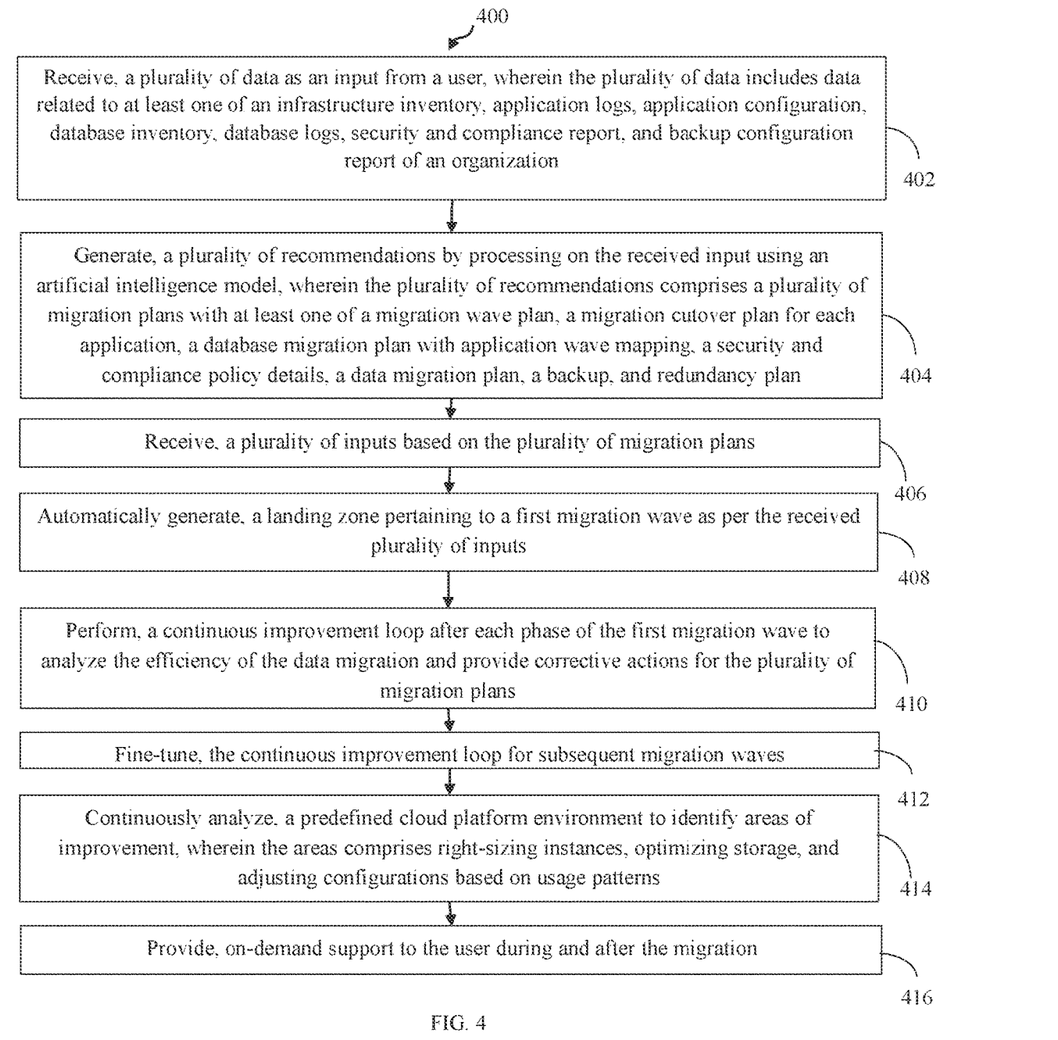
FIG. 4 is a flow chart representing steps involved in a method for organizing data migration in accordance with an embodiment of the present disclosure.

FIG. 4 is a flow chart representing steps involved in a method for organizing data migration in accordance with an embodiment of the present disclosure.

The method 400 includes interfacing, receiving, by a receiving module, a plurality of data as an input from a user, wherein the plurality of data includes data related to at least one of an infrastructure inventory, application logs, application configuration, database inventory, database logs, security and compliance report, and backup configuration report of an organization in step 402. The method 400 includes recognizing a role the databases play in the plurality of applications.

The method 400 also includes utilizing cutting-edge machine learning algorithms to analyze the received data and the database dependencies. The method 400 also includes generating the logs by the server, the plurality of applications, and a plurality of network devices, wherein the logs comprises historical usage patterns, performance metrics, error records, and critical insights for informing the migration strategy to the artificial intelligence model.

The method 400 also includes generating, by a recommendation module, a plurality of recommendations by processing on the received input using an artificial intelligence model, wherein the plurality of recommendations comprises a plurality of migration plans with at least one of a migration wave plan, a migration cutover plan for each application, a database migration plan with application wave mapping, a security and compliance policy details, a data migration plan, a backup, and redundancy plan in step 404. The method 400 also includes leveraging, use of artificial intelligence models for drawing up historical data from previous migrations, and unique insights into the organization's needs and challenges.

Further, the method 400 includes receiving, by cloud migration module, a plurality of inputs based on the plurality of migration plans in step 406. The method 400 also includes identifying dependency of the plurality of applications on specific databases and dependency of the specific databases on the plurality of applications.

Furthermore, the method 400 includes automatically generating, by the cloud migration module, a landing zone pertaining to a first migration wave as per the received plurality of inputs in step 408. The method 400 also includes prioritizing the plurality of applications based on a criticality of the plurality of the applications, wherein the migration plan outlines a precise sequence of migration and timing of each migration.

Furthermore, the method 400 includes performing, by a post-migration phase module, a continuous improvement loop after each phase of the first migration wave to analyze the efficiency of the data migration and provide corrective actions for the plurality of migration plans in step 410.

Furthermore, the method 400 includes fine-tuning, by the post-migration phase module, the continuous improvement loop for subsequent migration waves in step 412. The method 400 also includes training and tuning a machine learning model for the data migration and incorporating insights from past migrations and domain-specific knowledge to make precise predictions and informed decisions. The method 400 includes avoiding disruptions during the data migration by analyzing interdependency of the plurality of applications.

Furthermore, the method 400 includes continuously analyzing, by the post-migration phase module, a predefined cloud platform environment to identify areas of improvement. The areas comprises right-sizing instances, optimizing storage, and adjusting configurations based on usage patterns in step 414.

Furthermore, the method 400 includes providing, by a chatbot module, on-demand support to the user during and after the migration in step 416. The method 400 also includes answering questions asked by the user, providing documentation, and assisting the user during the data migration.

Various embodiments of the present disclosure provides a computer-implemented system for an automatically organizing data migration. The system disclosed in the present disclosure provides an artificial intelligence enabled system for data organization. The system disclosed in the present disclosure is to provide automatic data migration by avoiding manual expertise and skills to plan and execute a cloud migration effectively. The cloud migration module disclosed in the present disclosure provide the system for organizing data migration which is suitable for cloud migration and hence cost effective. The post-migration phase module disclosed in the present disclosure provides a careful configuration and fine tuning for an optimal performance in the cloud and hence minimizes downtime during migration.

Further, the chatbot module of computer implemented system disclosed in the present disclosure is user friendly by answering the questions asked by the user, provides documentation, and assists the user during the data migration. The computer implemented system provides effective data migration by avoiding disruptions during the data migration by analyzing interdependency of the plurality of applications.

Combination of the receiving module, the recommendation module, the cloud migration module, the post-migration phase module, and the chatbot module effectively plan and organize data migration by achieving optimal performance in cloud migration. An optimum data migration planning allows to migrate large volume data to the cloud. The recommendation module disclosed in the present disclosure considers past experiences to provide recommendation for future data migration planning.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and is not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A computer-implemented system for organizing data migration comprising:
   a hardware processor;
   a memory coupled to the hardware processor, wherein the memory comprises a set of instructions in the form of a processing subsystem, configured to be executed by the hardware processor, wherein the processing subsystem is hosted on a server, and configured to execute on a network to control bidirectional communications among a plurality of modules wherein the plurality of modules comprises:
      a receiving module configured to receive a plurality of data as an input from a user, wherein the plurality of data includes data related to at least one of an infrastructure inventory data, application logs, application configuration, database inventory, database logs, security and compliance report, and backup configuration report of an organization;
      a recommendation module operatively connected to the receiving module, wherein the recommendation module is configured to generate a plurality of recommendations by processing on the received input using an artificial intelligence model,
   wherein the artificial intelligence model validates migration planning process comprising grouping of the plurality of applications into migration waves, wherein each migration wave represents a set of applications scheduled to migrate together, and
   wherein the plurality of recommendation comprises:
   a plurality of migration plans comprising at least one of a migration wave plan, a migration cutover plan for each application, a database migration plan with application wave mapping, a security and compliance policy details, a data migration plan, a backup, and redundancy plan;
      a cloud migration module operatively connected with the recommendation module, wherein the cloud migration module is configured to:
         receive a plurality of inputs based on the plurality of migration plans; and
         automatically generate a landing zone pertaining to a first migration wave as per the received plurality of inputs;
      a post-migration phase module operatively connected to the cloud migration module, wherein the post-migration phase module is configured to:
         perform a continuous improvement loop after each phase of the first migration wave to analyze the efficiency of the data migration and provide corrective actions for the plurality of migration plans;
         fine-tune a continuous improvement loop for subsequent migration waves; and
         continuously analyze a predefined cloud platform environment to identify areas of improvement, wherein the areas comprises right-sizing instances, optimizing storage, and adjusting configurations based on usage patterns; and
      a chatbot module operatively connected to the post-migration phase module wherein the chatbot module is configured to provide on-demand support to the user during and after the migration.

2. The system according to claim 1, wherein the recommendation module performs processing on the received inputs by a plurality of applications, wherein the plurality of application comprises at least one of a dependency mapping, a database dependency mapping, an application business hours calculation, a target server sizing based on current and forecasting, a security and compliance mapping based on assessment reports, a target server optimization based on server inventory and usage capacity, a backup policies, and a redundancy.

3. The system according to claim 1, wherein the recommendation module is configured to classify the plurality of applications into migration waves using artificial intelligence.

4. The system according to claim 1, wherein the cloud migration module automatically generates a plurality of migrations comprising at least one of a storage migration, a network migration, a migration, a server migration, and an application migration.

5. The system according to claim 1, wherein the post migration phase module is configured to generate a plurality of documents related to a plurality of reports of the migration process, timelines, resource configurations, and performance metrics using artificial intelligence.

6. The system according to claim 1, wherein the post migration phase module is configured to analyze errors that occur during the migration and provide automated remediation plans.

7. The system according to claim 1, wherein the chatbot module is configured to answer questions asked by the user, provide documentation, and assist the user during the data migration.

8. The system according to claim 1, wherein the inventory data comprises a comprehensive list of the plurality of applications, servers, virtual machines, and a plurality of assets used within the organization, wherein the inventory serves as the foundation for understanding a scope of the migration.

9. A method for organizing data migration comprises:
   receiving, by a receiving module, a plurality of data as an input from a user, wherein the plurality of data includes data related to at least one of an infrastructure inventory, application logs, application configuration, database inventory, database logs, security and compliance report, and backup configuration report of an organization;
   generating, by a recommendation module, a plurality of recommendations by processing on the received input using an artificial intelligence model,
   wherein the artificial intelligence model validates migration planning process comprising grouping of the plurality of applications into migration waves, wherein each migration wave represents a set of applications scheduled to migrate together, and
   wherein the plurality of recommendations comprises a plurality of migration plans with at least one of a migration wave plan, a migration cutover plan for each application, a database migration plan with application wave mapping, a security and compliance policy details, a data migration plan, a backup, and redundancy plan;

receiving, by cloud migration module, a plurality of inputs based on the plurality of migration plans;

automatically generating, by the cloud migration module, a landing zone pertaining to a first migration wave as per the received plurality of inputs;

performing, by a post-migration phase module, a continuous improvement loop after each phase of the first migration wave to analyze the efficiency of the data migration and provide corrective actions for the plurality of migration plans;

fine-tuning, by the post-migration phase module, the continuous improvement loop for subsequent migration waves;

continuously analyzing, by the post-migration phase module, a predefined cloud platform environment to identify areas of improvement, wherein the areas comprises right-sizing instances, optimizing storage, and adjusting configurations based on usage patterns; and providing, by a chatbot module, on-demand support to the user during and after the migration.

10. The method according to claim 9, comprises utilizing cutting-edge machine learning algorithms to analyze the received data and the database dependencies.

11. The method according to claim 9, comprises generating the logs by the server, the plurality of applications, and a plurality of network devices wherein the logs comprises historical usage patterns, performance metrics, error records, and critical insights for informing the migration strategy to the artificial intelligence model.

12. The method according to claim 9, comprises recognizing a role the databases play in the plurality of applications.

13. The method according to claim 9, comprises identifying dependency of the plurality of applications on a specific database and dependency of the specific databases on the plurality of applications.

14. The method according to claim 9, comprises training and tuning a machine learning model for the data migration and incorporating insights from past migrations and domain-specific knowledge to make precise predictions and informed decisions.

15. The method according to claim 9, comprises prioritizing the plurality of applications based on a criticality of the plurality of the applications, wherein the migration plan outlines a precise sequence of migration and timing of each migration.

16. The method according to claim 9, comprises avoiding disruptions during the data migration by analyzing interdependency of the plurality of applications.

17. The method according to claim 9, comprises leveraging, use of artificial intelligence model for drawing up historical data from previous migrations, and unique insights into the organization's needs and challenges.

18. A non-transitory computer-readable medium storing a computer program that, when executed by a processor, causes the processor to perform a method for organizing data migration, wherein the method comprises:

receiving, by a receiving module, a plurality of data as an input from a user, wherein the plurality of data includes data related to at least one of an infrastructure inventory, application logs, application configuration, database inventory, database logs, security and compliance report, and backup configuration report of an organization;

generating, by a recommendation module, a plurality of recommendations by processing on the received input using an artificial intelligence model, wherein the artificial intelligence model validates migration planning process comprising grouping of the plurality of applications into migration waves, wherein each migration wave represents a set of applications scheduled to migrate together, and wherein the plurality of recommendations comprises a plurality of migration plans with at least one of a migration wave plan, a migration cutover plan for each application, a database migration plan with application wave mapping, a security and compliance policy details, a data migration plan, a backup, and redundancy plan;

receiving, by cloud migration module, a plurality of inputs based on the plurality of migration plans;

automatically generating, by the cloud migration module, a landing zone pertaining to a first migration wave as per the received plurality of inputs;

performing, by a post-migration phase module, a continuous improvement loop after each phase of the first migration wave to analyze the efficiency of the data migration and provide corrective actions for the plurality of migration plans;

fine-tuning, by the post-migration phase module, the continuous improvement loop for subsequent migration waves;

continuously analyzing, by the post-migration phase module, a predefined cloud platform environment to identify areas of improvement, wherein the areas comprises right-sizing instances, optimizing storage, and adjusting configurations based on usage patterns; and providing, by a chatbot module, on-demand support to the user during and after the migration.

* * * * *